US012592445B2

(12) United States Patent
Schmitt et al.

(10) Patent No.: US 12,592,445 B2
(45) Date of Patent: Mar. 31, 2026

(54) ELECTROCHEMICAL ENERGY STORAGE SYSTEM, VEHICLE, METHOD FOR FIXING AND POSITIONING A COMPONENT, AND PAIR OF WEDGE BODIES

(71) Applicant: Robert Bosch GmbH, Stuttgart (DE)

(72) Inventors: Markus Schmitt, Tamm (DE); Ralph Glemser, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 400 days.

(21) Appl. No.: 18/343,122

(22) Filed: Jun. 28, 2023

(65) Prior Publication Data

US 2024/0006705 A1 Jan. 4, 2024

(30) Foreign Application Priority Data

Jun. 30, 2022 (DE) ..................... 10 2022 206 721.5

(51) Int. Cl.
*H01M 50/291* (2021.01)
*B60K 1/04* (2019.01)
*H01M 50/249* (2021.01)
*H01M 50/262* (2021.01)
*H01M 50/293* (2021.01)

(52) U.S. Cl.
CPC ............. *H01M 50/291* (2021.01); *B60K 1/04* (2013.01); *H01M 50/249* (2021.01); *H01M 50/262* (2021.01); *H01M 50/293* (2021.01); *B60K 2001/0411* (2013.01); *H01M 2220/20* (2013.01)

(58) Field of Classification Search
CPC ............. H01M 50/291; H01M 50/249; H01M 50/262; H01M 50/293; B60K 2001/0411; B60K 2001/0416; B60K 2001/0438
See application file for complete search history.

(56) References Cited

U.S. PATENT DOCUMENTS

| 8,936,124 B2 * | 1/2015 | Auer | ................... H01M 50/262 |
| | | | 180/68.5 |
| 10,442,473 B2 * | 10/2019 | Erlacher | ............. H01M 50/262 |
| 11,145,918 B2 * | 10/2021 | Kalmbach | ......... H01M 10/6556 |
| 11,901,574 B2 * | 2/2024 | Bell | .................... H01M 50/209 |
| 12,230,829 B2 * | 2/2025 | DeKeuster | .......... H01M 50/284 |

(Continued)

FOREIGN PATENT DOCUMENTS

| CN | 212810450 U | 3/2021 |
| DE | 102019004891 A1 | 1/2021 |

*Primary Examiner* — Jeffrey J Restifo
(74) *Attorney, Agent, or Firm* — Michael Best & Friedrich LLP

(57) ABSTRACT

An electrochemical energy storage system including a housing having an interior space, a component, and a wedge body pair. The wedge body pair includes a wedge body having a wedge body tip and a wedge body end, and the wedge body includes a component section at least regionally on the component arranged in the interior space of the housing. The wedge body pair also includes a counter-wedge body having a counter-wedge body tip and a counter-wedge body end. The counter-wedge body is arranged with a housing section at least regionally on a housing inner wall of the housing. The wedge body is arranged with a counter-wedge body section at least regionally on a wedge body section of the counter-wedge body in order to generate a wedge force for fixing and positioning the component arranged in the interior space of the housing.

16 Claims, 6 Drawing Sheets

(56)          References Cited

U.S. PATENT DOCUMENTS

| | | | | |
|---|---|---|---|---|
| 12,237,522 | B2 * | 2/2025 | Lee ..................... | H01M 50/271 |
| 2024/0006705 | A1 * | 1/2024 | Schmitt .............. | H01M 50/293 |
| 2024/0250370 | A1 * | 7/2024 | Zhu ..................... | H01M 50/209 |
| 2025/0125498 | A1 * | 4/2025 | Schmid .............. | H01M 50/249 |

* cited by examiner

ELECTROCHEMICAL ENERGY STORAGE SYSTEM, VEHICLE, METHOD FOR FIXING AND POSITIONING A COMPONENT, AND PAIR OF WEDGE BODIES

BACKGROUND

Lithium-ion or lithium polymer battery cells heat up as a result of chemical conversion processes, especially during rapid energy release or absorption in battery systems used as electrochemical energy storage systems. The more powerful the battery system, the greater its heating and, consequently, the need for an efficient active thermal management system.

Cell cooling can be achieved by liquid temperature adjustment using a water/glycol mixture. The fluid is directed through channels of the cooling element located below the cell stack. The supply of the cooling plates is achieved using a cooling water hose having corresponding further components in the cooling circuit.

During operation of the battery system, the cells can swell as they operate, and forces are generated in the longitudinal direction of the cell stack. These forces can increase from "Begin of Life" (BoL) to "End of Life" (EoL) and can cause stresses in the cell stack or a housing in which the cell stack is accommodated.

SUMMARY

The present invention discloses an electrochemical energy storage system, a vehicle, a method, and one pair of wedge bodies.

Further features and details of the invention follow from the dependent claims, the description, and the drawings. In this context, features and details described in connection with the electrochemical energy storage system according to the invention obviously also apply in connection with the vehicle according to the invention, the method according to the invention, and the pair of wedge bodies according to the invention, and vice versa in each case, so that reference is or can always be made mutually with regard to the disclosure concerning the individual aspects of the invention.

According to a first aspect, the present invention discloses an electrochemical energy storage system for a vehicle, the electrochemical energy storage system comprising a housing having an interior space, at least one component arranged in the interior space of the housing, and at least one pair of wedge bodies for fixing and positioning at least one component arranged in the interior space of the housing. The pair of wedge bodies comprises a wedge body having a component section and a counter-wedge body section, in which case the counter wedge body section is arranged inclined at least regionally to the component section such that the wedge body forms a wedge body end and a wedge body tip opposite to the wedge body end in a wedge body direction of the wedge body, the wedge body being arranged with the component section at least regionally on the component arranged in the interior space of the housing. Furthermore, the pair of wedge bodies comprises the counter-wedge body having a housing section and a wedge body section, in which case the wedge body section is arranged at least regionally inclined to the housing section such that the counter-wedge body forms a counter-wedge body end and a counter-wedge body tip opposite the counter-wedge body end in a counter-wedge body direction of the counter-wedge body, the counter-wedge body being arranged with the housing section at least regionally on a housing inner wall of the housing. Furthermore, along a height direction of the housing, the counter-wedge body is arranged in the counter-wedge body direction with the wedge body section opposite to the wedge body direction of the wedge body, at least regionally, on the counter-wedge body section of the wedge body for generating a wedge force, in particular along a longitudinal direction and/or a width direction of the housing, for fixing and positioning at least one component arranged in the interior space of the housing, for example a battery cell stack.

The electrochemical energy storage system is in particular a battery storage system. Further, in particular, at least one component received in the interior space of the housing is to be understood as a battery cell stack. The battery cell stack can be bonded to a bottom of the housing using a thermally conductive adhesive. Further, the battery cell stack can include an end plate at a first battery cell stack end and a second battery cell stack end opposite the first battery cell stack end for crimping the battery cell stack.

The positioning of at least one component in the interior space of the housing is to be understood in particular as moving at least one component to a predefined location in the interior space of the housing. Fixing at least one component in the interior space of the housing can be understood as tightening or fixing at least one component in the interior space of the housing, preferably at the predefined position.

The housing can be box-shaped.

Further, the housing can be a diecast component. In this case, the interior space of the housing is formed by a mold half in the die casting mold, which has a demolding bevel for demolding from the tool, wherein very small demolding angles are used for installation space reasons. The diecast component can, for example, have a demolding angle of 1.2°.

In particular, the wedge body is thermally insulating and/or the counter-wedge body is thermally insulating. For example, the wedge body and/or the counter-wedge body can be made of a thermally insulating plastic. Thus, a heat flow between the housing and at least one component can be kept particularly low.

In particular, the component section of the wedge body and the counter-wedge body section face each other. Also, in particular, the housing section of the counter-wedge body and the wedge body section of the counter-wedge body are opposite to each other.

The arrangement of the wedge body with the component section on the component arranged in the interior space of the housing is in particular understood to mean contact, preferably direct contact.

Arranging the counter-wedge body with the housing section on the inner wall of the housing is in particular also understood to mean contact, preferably direct contact.

The expression "whereby, along a height direction of the housing, the counter-wedge body is arranged in the counter-wedge body direction with the wedge body section opposite the wedge body direction of the wedge body at least regionally on the counter-wedge body section of the wedge body" can be understood in particular to mean that the wedge body end of the wedge body, in particular in a final state, faces a housing bottom of the housing, and the wedge body tip of the wedge body, in particular in a final state, faces away from the housing bottom of the housing, the counter-wedge body tip of the counter-wedge body, in particular in a final state, facing the housing bottom of the housing, and the counter-wedge body end, in particular in a final state, facing away from the housing bottom of the housing.

Advantageously, the pair of wedge bodies according to the invention can be used to position and fix at least one component in a particularly straightforward and cost-effective manner and to achieve a particularly large tolerance compensation. Tolerance compensation in a longitudinal direction and/or a width direction of the housing may be necessary because both at least one component, e.g., a battery cell stack, is subject to certain technical manufacturing tolerances, and the housing is also subject to certain technical manufacturing tolerances. Using the pair of wedge bodies, which can also be understood as a two-piece pair of wedge bodies, a larger tolerance can be compensated for in a longitudinal direction and/or a width direction of the housing on the housing, e.g., a diecast housing with a draft, and on the component, e.g., a battery cell stack, than with an integral wedge. Furthermore, the pair of wedge bodies can be used to maintain the contact between surfaces of the inner wall of the housing and at least one component particularly low, and thermal resistance can thus be particularly high. A thermal heat flow between the component and the housing can thus be kept particularly low. The pair of wedges is therefore also used to provide thermal decoupling. In other words, the pair of wedge bodies can provide additional thermal decoupling between at least one component, e.g., a battery cell stack, and the housing. In addition, the pair of wedge bodies can also provide a determinable distance, particularly in a longitudinal direction and/or a width direction of the housing, between the housing and at least one component. An air gap can therefore form between the housing and at least one component, which has a thermally insulating effect.

It can be advantageous if, in an electrochemical energy storage system according to the invention, the component section of the wedge body comprises at least one fixing element for fixing the wedge body on the component, in particular on a counter-fixing element of the component. The wedge body can as a result be prefixed on at least one component, e.g., an end plate of a battery cell stack. For this purpose, at least one component can comprise a counter-fixing element, e.g., a bore. Furthermore, said fixing of the wedge body on at least one component, in particular on a counter-fixing element of the components, can be a frictional and/or bonded fixing of the wedge body. For example, the wedge body can comprise two domes as fixing elements, which engage in two bores as counter-fixing elements on at least one component, e.g., an end plate of a battery cell stack. As a result, the wedge body need to be affixed to the component. In particular, the fixing element prevents the wedge body from being displaceable in the height direction of the housing. In other words, the wedge body is immovable in the height direction of the housing by means of the fixing element.

Advantageously, in an electrochemical energy storage system according to the invention, the component section of the wedge body can comprise a planar or essentially planar contacting surface for contacting the component arranged in the interior space of the housing. The wedge body can therefore have a particularly straightforward design and be particularly cost-effective. The wedge body having the planar or essentially planar contacting surface can particularly advantageously apply pressure to a planar or essentially planar counter-contacting surface of at least one component. For example, a particularly uniform pressure can thus be applied to a planar or essentially planar counter-contacting surface of an end plate of a battery cell stack. The term "essentially planar" is intended to express that the contacting surface of the component section or the counter-contacting surface of at least one component is subject to certain manufacturing tolerances.

With particular advantage, in an electrochemical energy storage system according to the invention, the housing section of the counter-wedge body can be designed to have a cylindrical shape, in particular the shape of a skewed cylinder, in the counter-wedge body direction of the counter-wedge body, and the housing inner wall of the housing is designed in a corresponding manner. A cylindrical mounting surface can as a result be formed between the counter-wedge body and the inner wall of the housing such that the wedge force is constant or substantially constant. In other words, such a design for the housing section of the counter-wedge body and a corresponding design for the housing or the housing inner wall of the housing can ensure that the same or essentially the same wedge force is exerted on the mounting surface or the mounting surfaces over a displacement height of the counter-wedge body in the height direction of the housing. The correspondingly designed inner wall of the housing can in particular simultaneously form a guide groove for guiding the counter-wedge body in the height direction of the housing. The counter-wedge body can as a result be placed on the inner wall of the housing in a particularly defined manner.

According to a further preferred embodiment, in an electrochemical energy storage system according to the invention, the counter-wedge body can comprise at least one locking element on the housing section and/or on the wedge body section for arrangement on a counter-locking element in order to create an interlocking connection used to prevent at least displacement of the wedge body and the counter-wedge body relative to each other along the height direction of the housing. As a result, when the counter-wedge body is mounted or a counter-wedge body is mounted, it can be ensured that the counter-wedge body remains in its position, in particular in its end position. In other words, the counter-wedge body and/or the wedge body can be prevented from then coming loose from the position used for fixing and positioning at least one component in the interior space of the housing. The locking element can, e.g., be a latching element, the counter-locking element preferably being a counter-latching element. The latching element and the counter-latching element can each have a tooth-like design. It is also conceivable that the counter-wedge body have multiple locking elements. The multiple locking elements can be designed at a distance from each other along the counter-wedge body direction on the housing section and/or the wedge body section. Unintentional displacement of the counter-wedge body or wedge body can as a result be prevented with particular reliability, even given varying penetration depths of the counter-wedge body.

It can be advantageous if, in an electrochemical energy storage system according to the invention, the inner wall of the housing comprises the counter-locking element for the locking element of the housing section of the counter-wedge body for creating the interlocking connection, and/or that the wedge body on the counter-wedge body section comprises the counter-locking element for the locking element of the wedge body section of the counter-wedge body for creating the interlocking connection in order to prevent at least the displacement of the wedge body and the counter-wedge body relative to each other along the height direction of the housing. A displacement of the counter-wedge body or the wedge body relative to each other along the height direction of the housing can as a result be prevented in a particularly simple manner, thus ensuring the positioning and fixing of at least one component in the interior space of the housing.

Advantageously, in an electrochemical energy storage system according to the invention, a wedge body angle of the wedge body and a counter-wedge body angle of the counter-wedge body can be different. Preferably, the counter-wedge body angle of the counter-wedge body is larger than the wedge body angle of the wedge body. The counter-wedge body angle is in particular between 3 and 10°, preferably between 4 and 7°. The counter-wedge body can therefore have a particularly large counter-wedge body rear at the counter-wedge body end for applying a force such that the counter-wedge body can be mounted via the counter-wedge body rear particularly easily, safely, and with a particularly defined force. At the same time, installation space conditions in the housing can be taken into account with different angles, so a loss of installation space can be kept particularly low.

With particular advantage, in an electrochemical energy storage system according to the invention, the wedge body can comprise at least one recess at the component section for reducing contact with the component accommodated in the interior space of the housing, and/or the wedge body can comprise at least one recess on the counter-wedge body section for reducing contact with the counter-wedge body, and/or the counter-wedge body can comprise, on the housing section, at least one recess for reducing contact with the housing inner wall of the housing, and/or the counter-wedge body can comprise, on the wedge body section, at least one recess for reducing contact with the wedge body. By reducing said contact in each case, a heat flow between the housing and at least one component can be kept particularly low. In particular, the wedge body can comprise at least one recessed area or two recessed areas arranged in parallel and at a distance from one another other along the wedge body direction on the counter-wedge body section. The counter-wedge body can further comprise a correspondingly arranged recessed area or two parallel recessed areas at a distance from one another on the wedge body section along the counter-wedge body direction. A sliding area can be formed on the wedge body and/or the counter-wedge body between the two parallel recessed areas for particularly easy displacement of the wedge body and the counter-wedge body relative to each other in the height direction of the housing. The counter-wedge body can further comprise multiple recesses formed along the counter-wedge body direction on the housing section offset from each other in order to reduce contact between the counter-wedge body and the inner wall of the housing. As a result, at least one component, e.g., a battery cell stack, can be thermally decoupled from the housing in a particularly advantageous manner. The multiple offset recesses can, e.g., be crater-shaped or pocket-shaped.

According to a further preferred embodiment, in an electrochemical energy storage system according to the invention, the wedge body can be a plastic injection molding, in particular a thermally insulating plastic injection molding, and/or the counter-wedge body can be a plastic injection molding, in particular a thermally insulating plastic injection molding. More complex wedge bodies and/or counter-wedge bodies can as a result also be produced. Preferably, furthermore, the wedge body has an integral design, and/or the counter-wedge body has an integral design. The wedge body and/or the counter-wedge body can as a result be particularly cost-effective and stable.

According to another preferred embodiment, an electrochemical energy storage system according to the invention can comprise at least one further pair of wedge bodies, in which case at least one further pair of wedge bodies is arranged between at least one component and the housing in the interior space of the housing in order to fix and position at least one component arranged in the interior space of the housing. The least one component can as a result be fixed and positioned in a particularly secure manner and advantageously in the interior space of the housing. Features and/or details and/or explanations mentioned for the pair of wedge bodies in the preceding and/or following paragraphs can also be applied to at least one further pair of wedge bodies, and vice versa. The housing and/or at least one component, e.g. a battery cell stack, can feature various deviations from a nominal value at different locations, so that varying compensation is necessary for positioning and fixing at least one component. By using two pairs of wedge bodies, tolerances can be easily and safely compensated for independently and at different points. For this purpose, the two pairs of wedge bodies, in particular the two counter-wedge bodies, can be inserted at different depths, e.g., in guide grooves on the housing, in the height direction of the housing in order to position and fix at least one component in the interior space of the housing.

According to a second aspect, the present invention discloses a vehicle, the vehicle comprising an electrochemical energy storage system.

The vehicle can be a motor vehicle, in particular a passenger car or a truck. The motor vehicle can also be driven, in particular moved, by means of electrical energy from the electrochemical energy storage system. In other words, the electrical energy of the electrochemical energy storage system in particular is used to drive, especially move, the motor vehicle. In particular, at least one component accommodated in the interior space of the housing can be a battery cell stack, in which case the battery cell stack provides the electrical energy for driving, in particular moving, the motor vehicle.

The vehicle according to the second aspect of the invention thus exhibits the same advantages as have already been described with respect to the electrochemical energy storage system according to the first aspect of the invention.

According to a third aspect, the present invention discloses a method for fixing and positioning a component in an interior space of a housing of an electrochemical energy storage system, in particular the electrochemical energy storage system being designed according to the invention. The method comprises one step for providing at least one pair of wedge bodies comprising a wedge body and a counter-wedge body. The method also comprises one further step for arranging the wedge body on the component of the electrochemical energy storage system. The method further comprises one step for arranging the component having said wedge body arranged on the component in the interior space of the housing of the electrochemical energy storage system. The method further comprises one step for arranging the counter-wedge body between the wedge body and a housing inner wall of the housing in order to generate a wedge force, in particular in a longitudinal and/or width direction of the housing, for fixing and positioning the component in the interior space of the housing of the electrochemical energy storage system.

Said arrangement of the wedge body on the component of the electrochemical energy storage system can be a frictional fit and/or an interlocking fit between the wedge body and the component. For example, the wedge body can be arranged by means of a dome or multiple domes in a frictional or interlocking manner on the component, e.g., on an end plate of a battery cell stack. The wedge body is therefore prefixed to the component.

Preferably, the arrangement of the wedge body on the component of the electrochemical energy storage system is performed before the component is placed in the interior space of the housing. The wedge body can therefore be arranged on the component in a particularly straightforward manner. After the wedge body has been arranged on the component of the electrochemical energy storage means, the component, e.g., a battery cell stack, is arranged in the interior space of the housing together with the wedge body arranged on the component. The counter-wedge body is then arranged between the wedge body and the inner wall of the housing in order to fix and position at least one component, e.g., a battery cell stack, in the housing. In particular, the wedge body section of counter-wedge body is for this purpose arranged on the counter-wedge body section of the wedge body, the housing section of said wedge body being arranged on the housing inner wall of the housing and being moved toward a housing bottom of the housing.

The arrangement of the counter-wedge body between the wedge body and the inner wall of the housing in order to generate a wedge force is in particular performed in the height direction of the housing. In addition, the arrangement of the counter-wedge body between the wedge body and the housing inner wall can be performed by means of a determinable force. The force for arranging the counter-wedge body into an end position is applied in particular to a counter-wedge body rear of the counter-wedge body. It is as a result particularly easy to move the counter-wedge body into the end position.

The method steps described hereinabove and hereinafter can be performed individually, together, once, several times, in parallel, and/or consecutively in any order, provided that doing so is technically feasible.

The method according to the third aspect of the invention therefore exhibits the same advantages as have already been described with respect to the electrochemical energy storage system according to the first aspect of the invention, or the vehicle according to the second aspect of the invention.

According to a fourth aspect, the present invention discloses a pair of wedge bodies, the pair of wedge bodies being a pair of wedge bodies designed according to the invention.

The pair of wedge bodies according to the fourth aspect of the invention therefore exhibits the same advantages as have already been described with respect to the electrochemical energy storage system according to the first aspect of the invention, or the vehicle according to the second aspect of the invention, or the method according to the third aspect of the invention.

Further measures for improving the invention follow from the following description of several exemplary embodiments of the invention, which are schematically illustrated in the drawings. All of the features and/or advantages arising from the claims, the description, or the drawings, including structural details, spatial arrangements and method steps, can be essential to the invention both by themselves and in the various combinations. It should in this context be noted that the drawings are only descriptive in nature and not intended to restrict the invention in any way.

BRIEF DESCRIPTION OF THE DRAWINGS

Schematically shown are.

In the subsequent drawings, identical reference characters are used for identical technical features of various exemplary embodiments.

DETAILED DESCRIPTION

Figure 1:
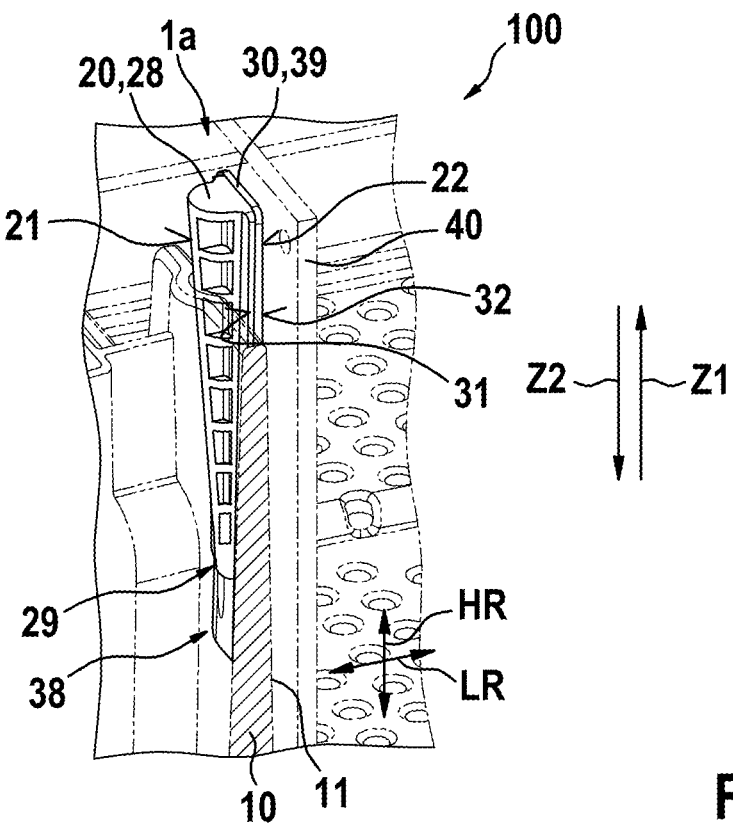
FIG. 1 a part of an electrochemical energy storage system,
FIG. 2 a part of an electrochemical energy storage system,
FIG. 3 a counter-wedge body,
FIG. 4 a wedge body,
FIG. 5 a counter-wedge body,
FIG. 6 a part of a pair of wedge bodies,
FIG. 7 a pair of wedge bodies, FIG. 8 a pair of wedge bodies,
FIG. 9 a part of a housing,
FIG. 10 a vehicle, and
FIG. 11 a method.
Figure 2:
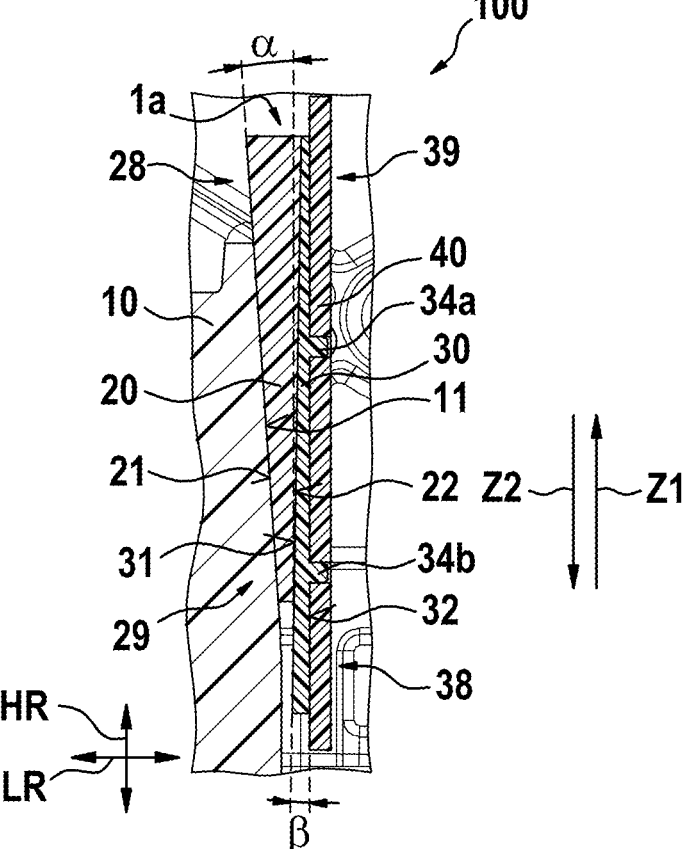
Figure 10:
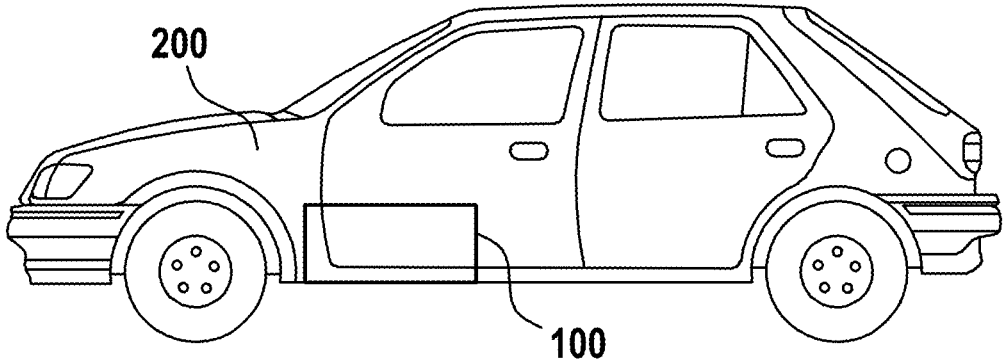

FIG. 1 discloses a perspective view and FIG. 2 discloses a side view of a portion of an electrochemical energy storage system 100 for a vehicle 200, e.g., that shown in FIG. 10. For the sake of clarity, the electrochemical energy storage system 100 is shown as partially transparent. The electrochemical energy storage system 100 comprises a housing 10 having an interior space I, at least one component 40 arranged in the interior space I of the housing 10, and at least one pair of wedge bodies 1a for fixing and positioning at least one component 40 arranged in the interior space I of the housing 10. For the sake of clarity, only one end plate of a battery cell stack is shown as at least one component 40 in FIG. 1 and FIG. 2. The pair of wedge bodies 1a, 1b comprises a wedge body 30 having a component section 32 and a counter-wedge body section 31, in which case the counter-wedge body section 31 is designed to be inclined to the component section 32 at least regionally such that the wedge body 30 forms a wedge body end 38 in a wedge body direction Z1 of the wedge body 30 and a wedge body tip 39 opposite to the wedge body end 38 in the wedge body direction Z1. Further, the wedge body 30 is arranged with the component section 32 on the component 40 arranged in the interior space I of the housing 10. In addition, the pair of wedge bodies 1a comprises the counter-wedge body 20 having a housing section 21 and a wedge body section 22, the wedge body section 22 being designed inclined to the housing section 21 at least regionally such that the counter-wedge body 20 forms a counter-wedge body end 28 in a counter-wedge body direction Z2 of the counter-wedge body 20 and a counter-wedge body tip 29 opposite to the counter-wedge body end 28 in the counter-wedge body direction Z2. Furthermore, the counter-wedge body 20 is arranged with the housing section 21 at least regionally on a housing inner wall 11 of the housing 10. As can further be seen from FIG. 1 or FIG. 2, along a height direction HR of the housing 10, the counter-wedge body 20 is arranged in the counter-wedge body direction Z2 with the wedge body section 22 opposite the wedge body direction Z1 of the wedge body 30 at least regionally on the counter-wedge body section 31 of the wedge body 30 such that a wedge force is generated in a longitudinal direction LR for fixing and positioning at least one component 40 arranged in the interior space I of the housing 10.

Furthermore, it can be seen in FIG. 2 that the wedge body 30 additionally comprises two exemplary dome-like fixing elements 34a, 34b on the component section 32 for fixing the wedge body 30 on the component 40. For this purpose, an end plate of a battery cell stack as component 40 comprises bores or recesses as counter-fixing elements. The wedge body 30 can therefore be prefixed to the component 40 particularly easily without an adhesive. In this case, the dome-like fixing elements 34a, 34b extend perpendicularly or essentially perpendicularly to the component section 32 of the wedge body 30. FIG. 2 also indicates that the component section 32 of the wedge body 30 further comprises a planar or essentially planar contacting surface for contacting the component 40 arranged in the interior space I of the housing 10.

Figure 9:
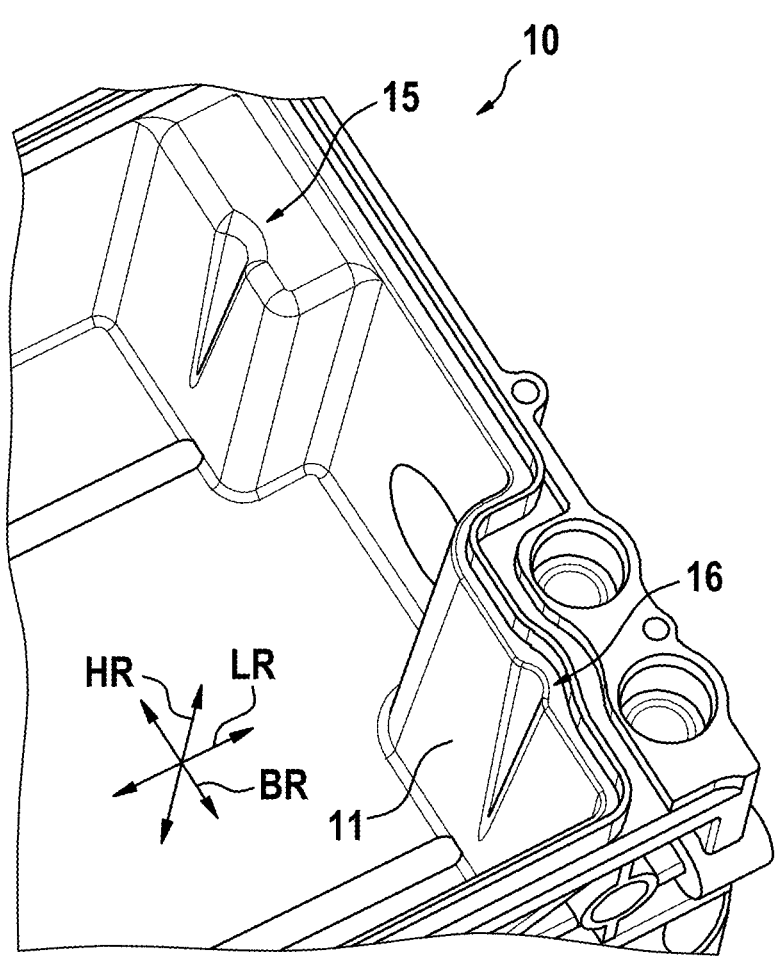

Furthermore, it can be seen in FIG. 1 that the housing section 21 of the counter-wedge body 20 is designed to have a cylindrical shape, in particular the shape of a skewed cylinder, in the counter-wedge body direction Z2 of the counter-wedge body 20, and the housing inner wall 11 of the housing 10 being designed in a corresponding manner. The inner wall 11 of the housing, which is designed to correspond to the cylindrical (in particular in the shape of a skewed cylinder) housing section 21 of the counter-wedge body 20, can also be seen in FIG. 9, in which case the inner wall 11 of the housing forms a guide groove 15 for a pair of wedge bodies 1a (not shown) on one side of the inner wall of the housing and a (further) guide groove 16 for a further pair of wedge bodies 2a (not shown) on the same side of the inner wall of the housing. Advantageously, such a design can ensure that the counter-wedge body 20 of the pair of wedge bodies 1a and a counter-wedge body 20 of the further pair of wedge bodies 1b themselves each contact the inner wall of the housing 11 in the guide groove 15 or in the guide groove 16 over only a minimal area. Furthermore, it can be seen in FIG. 2 that additionally a wedge body angle β of the wedge body 30 and a counter-wedge body angle α of the counter wedge body 20 are different. The counter-wedge body angle α of the counter-wedge body 20 can be, for example, 4° and the wedge body angle β of the wedge body 30 can be, e.g., 1°. The housing 10 can further be a diecast housing with a draft angle of, e.g., 1.2°.

Figure 3:
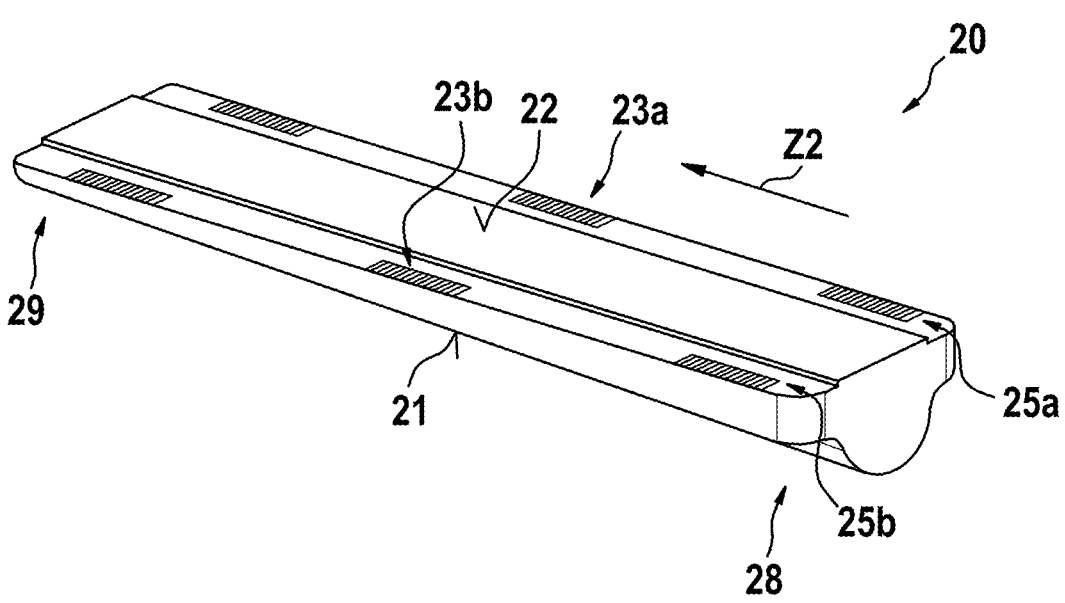
Figure 4:
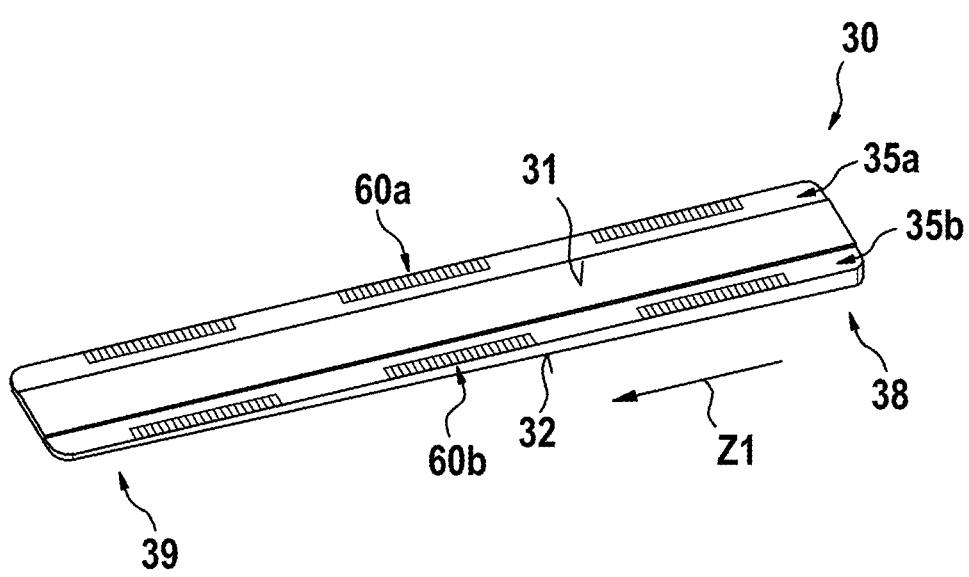

FIG. 3 and FIG. 4 each disclose a perspective view of a counter-wedge body 20 or wedge body 30, which can be used, e.g., in the electrochemical energy storage system 100 shown in FIG. 1 or FIG. 2 and as already described regarding FIG. 1 and FIG. 2. The counter-wedge body 20 and the wedge body 30 can together form a pair of wedge bodies 1a, as shown, e.g., in FIGS. 6, 7, and 8.

In addition, the counter-wedge body 20 shown in FIG. 3 comprises at the wedge body section 22, e.g., two locking elements 23a, 23b for arranging at a respective counter-locking element 60a, 60b for forming an interlocking connection such that a displacement of the wedge body 30 and the counter-wedge body 20 relative to each other along the height direction HR of the housing 10 can be prevented in an improved manner. The counter-wedge body 20 further comprises two recessed areas 25a, 25b arranged parallel to each other and at a distance from one another along the counter-wedge body direction Z2 at the wedge body section 22 for reducing contact with the wedge body 30. Advantageously, the two locking elements 23a, 23b of the counter-wedge body 20 are additionally formed in the recessed areas 25a, 25b of the counter-wedge body 20.

In addition, the wedge body 30 shown in FIG. 4 comprises, e.g., two counter-locking elements 60a, 60b on the counter-wedge body section 31. In addition, the wedge body 30 also has comprises recessed areas as recesses 35a, 35b arranged parallel to each other and at a distance from one another along the wedge body direction Z1 at the counter-wedge body section 31 for reducing contact with the counter-wedge body 20. Advantageously, the two counter-locking elements 60a, 60b of the wedge body 30 are additionally formed in the recessed areas 35b of the wedge body 30.

Figure 5:
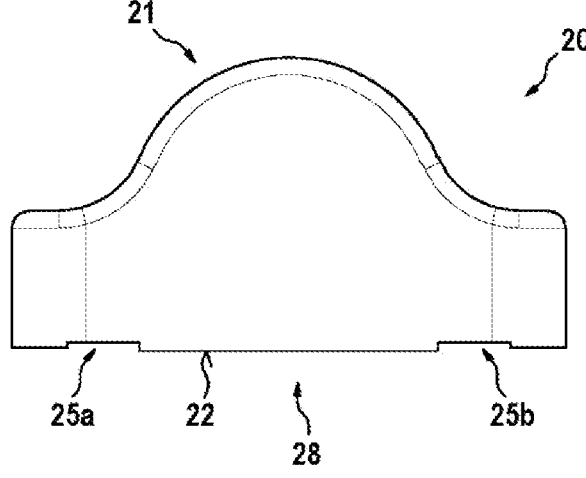

FIG. 5 discloses a counter-wedge body back of a counter-wedge body 20, e.g., as described with respect to the preceding drawings. The recessed areas 25a and 25b can be seen in this case. Furthermore, it can be seen in FIG. 5 that a sliding area for particularly easy displacement of the wedge body 30 and the counter-wedge body 20 in the height direction HR of the housing 10 is formed between the two recessed areas 25a, 25b on the wedge body section 22. A corresponding sliding area can also be provided by the wedge body 30 on the counter-wedge body section 31.

Figure 6:
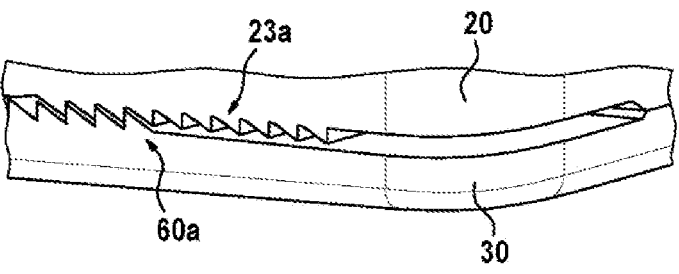

FIG. 6 shows a counter-wedge body 20 and a wedge body 30 as described, e.g., with respect to FIG. 3 or 4. In FIG. 6, it can be seen that the locking element 23a of the counter-wedge body 20 and the counter-locking element 60a are positively connected to each other to prevent displacement of the counter-wedge body 20 in a direction away from a bottom of the housing 10.

Figure 7:
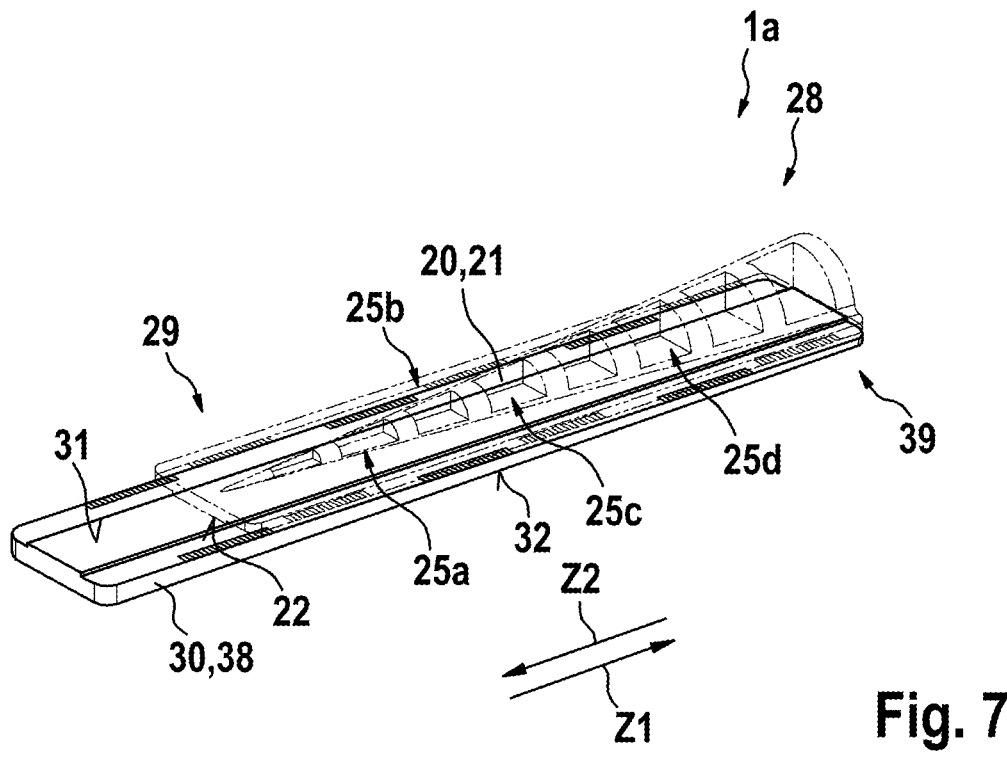
Figure 8:
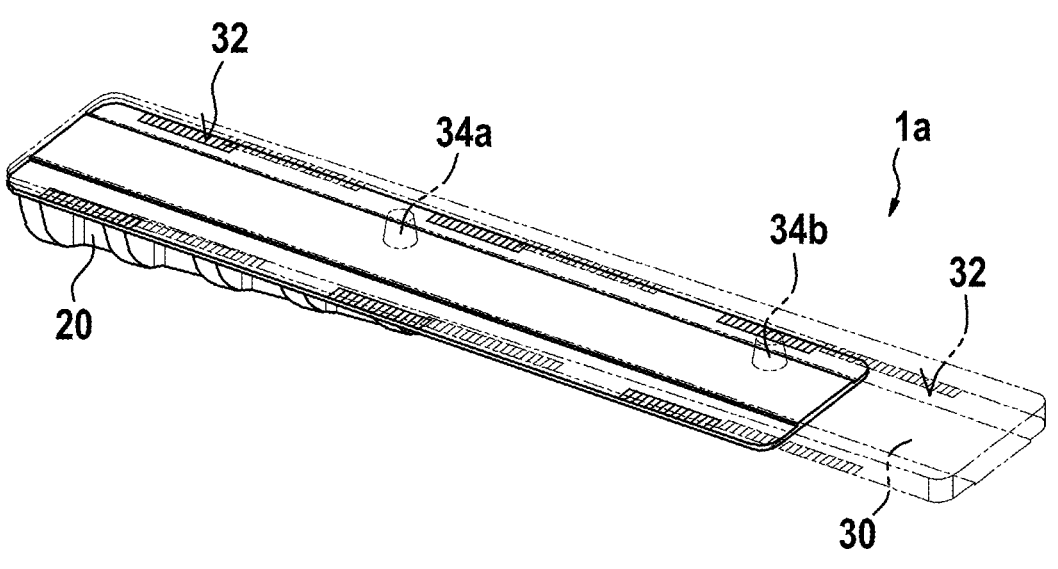

FIG. 7 and FIG. 8 each show a perspective view of a pair of wedge bodies 1a having a counter-wedge body 20 and a wedge body 30, as described, e.g., fin the previous drawings. As can be seen in FIG. 7, the counter-wedge body 20 can additionally comprise a plurality of recesses or depressions 25a, 25b, 25c, 25d formed along the counter-wedge body direction Z2 on the housing section 21 in an offset manner with respect to each other to reduce contact between the counter-wedge body 20 and the housing inner wall 11. In FIG. 8, additional, dome-like fixing elements 34a, 34b of the wedge body 30 can be seen on the component section 32.

FIG. 10 discloses a schematic view of a vehicle 200 having an electrochemical energy storage system 100 designed according to the invention.

Figure 11:
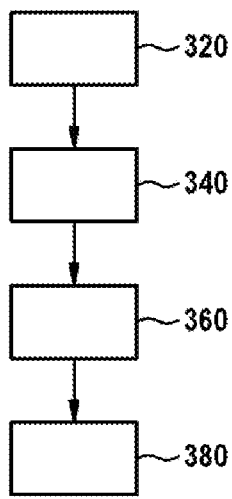

FIG. 11 discloses a method for fixing and positioning a component 40 in an interior space I of a housing 10 of an electrochemical energy storage system 100, as described, e.g., in the preceding drawings, whereby the electrochemical energy storage system 100 is in particular designed according to the invention. The method comprises one step for providing 320 at least one pair of wedge bodies 1a, 1b comprising a wedge body 30 and a counter-wedge body 20. The method comprises one further step for arranging 340 the wedge body 30 on the component 40 of the electrochemical energy storage system 100. The method comprises one further step for arranging 360 the component 40 with the wedge body 30 arranged on the component 40 into the interior space I of the housing 10 of the electrochemical energy storage system 100. The method also comprises one step for arranging 380 the counter-wedge body 20 between the wedge body 30 and a housing inner wall 11 of the housing 10 in order to generate a wedge force for fixing and positioning the component 40 in the interior space I of the housing 10 of the electrochemical energy storage system 100.

The invention claimed is:

1. An electrochemical energy storage system (100) for a vehicle (200), wherein the electrochemical energy storage system (100) comprises a housing (10) having an interior space (I), at least one component (40) arranged in the interior space (I) of the housing (10), and at least one pair of wedge bodies (1a, 1b) for fixing and positioning the at least one component (40) arranged in the interior space (I) of the housing (10), wherein the at least one pair of wedge bodies (1a, 1b) comprises:

a wedge body (30) having a component section (32) and a counter-wedge body section (31), wherein the counter-wedge body section (31) is configured to be inclined at least regionally relative to the component section (32) such that the wedge body (30) forms a wedge body end (38) and a wedge body tip (39) opposite the wedge body end (38) in a wedge body direction (Z1) of the wedge body (30), and wherein the wedge body (30) is arranged with the component section (32) at least regionally on the at least one component (40) arranged in the interior space (I) of the housing (10), a counter-wedge body (20) having a housing section (21) and a wedge body section (22), wherein the wedge body section (22) is configured to be inclined at least regionally relative to the housing section (21) such that the counter-wedge body (20) forms a counter-wedge body end (28) and a counter-wedge body tip (29) opposite the counter-wedge body end (28) in a counter-wedge body direction (Z2) of the counter-wedge body (20), and wherein the counter-wedge body (20) is arranged with the housing section (21) at least regionally on a housing inner wall (11) of the housing (10), wherein, along a height direction (HR) of the housing (10), the counter-wedge body (20) is arranged in the counter-wedge body direction (Z2) with the wedge body section (22) opposite the wedge body direction (Z1) of the wedge body (30) at least regionally on the counter-wedge body section (31) of the wedge body (30) in order to generate a wedge force for fixing and positioning the at least one component (40) arranged in the interior space (I) of the housing (10), wherein the housing section (21) of the counter-wedge body (20) is configured in a cylindrical shape in the counter-wedge body direction (Z2) of the counter-wedge body (20), and wherein the housing inner wall (11) of the housing (10) is configured in a corresponding manner.

2. The electrochemical energy storage system (100) according to claim 1, wherein the component section (32) of the wedge body (30) comprises at least one fixing element (34a, 34b) for fixing the wedge body (30) on the at least one component (40).

3. The electrochemical energy storage system (100) according to claim 1, wherein the component section (32) of the wedge body (30) comprises a planar or essentially planar contacting surface for contacting the at least one component (40) that is arranged in the interior space (I) of the housing (10).

4. The electrochemical energy storage system (100) according to claim 1, wherein the counter-wedge body (20) comprises at least one locking element (23a, 23b) on the housing section (21) and/or on the wedge body section (22) for arrangement on a counter-locking element (60a, 60b) to create an interlocking connection to prevent at least displacement of the wedge body (30) and the counter-wedge body (20) relative to each other along the height direction (HR) of the housing (10).

5. The electrochemical energy storage system (100) according to claim 4, wherein the housing inner wall (11) of the housing (10) comprises the counter-locking element (60a, 60b) for the at least one locking element (23a, 23b) of the housing section (21) of the counter-wedge body (20) for creating the interlocking connection, and/or the wedge body (30) on the counter-wedge body section (31) comprises the counter-locking element (60a, 60b) for the at least one locking element (23a, 23b) of the wedge body section (22) of the counter-wedge body (20) for creating the interlocking connection to prevent at least the displacement of the wedge body (30) and the counter-wedge body (20) relative to each other along the height direction (HR) of the housing (10).

6. The electrochemical energy storage system (100) according to claim 1, wherein a wedge body angle (B) of the wedge body (30) and a counter-wedge body angle ($\alpha$) of the counter-wedge body (20) are different.

7. The electrochemical energy storage system (100) according to claim 1, wherein the wedge body (30) comprises, on the component section (32), at least one recess (35a, 35b) for reducing contact with the at least one component (40) accommodated in the interior space (I) of the housing (10), and/or the wedge body (30) comprises, on the counter-wedge body section (31), at least one recess (35a, 35b) for reducing contact with the counter-wedge body (20), and/or the counter-wedge body (20) comprises at least one recess (25a, 25b, 25c, 25d) on the housing section (21) for reducing contact with the housing inner wall (11) of the housing (10), and/or the counter-wedge body (20) comprises at least one recess (25a, 25b, 25c, 25d) on the wedge body section (22) for reducing contact with the wedge body (30).

8. The electrochemical energy storage system (100) according to claim 1, wherein the wedge body (30) is a plastic injection molding and/or the counter-wedge body (20) is a plastic injection molding.

9. The electrochemical energy storage system (100) according to claim 8, wherein the wedge body (30) is a thermally insulating plastic injection molding, and/or wherein the counter-wedge body (20) is a thermally insulating plastic injection molding.

10. The electrochemical energy storage system (100) according to claim 1, wherein the electrochemical energy storage system (100) comprises at least one further wedge body pair (1a, 1b), wherein the at least one further wedge body pair (1a, 1b) is arranged between at least one component (40) and the housing (10) in the interior space (I) of the housing (10) in order to fix and position at least one component (40) arranged in the interior space (I) of the housing (10).

11. A vehicle (200), wherein the vehicle (200) comprises an electrochemical energy storage system (100) according to claim 1.

12. A method for fixing and positioning a component (40) in an interior space (I) of a housing (10) of an electrochemical energy storage system (100), wherein the electrochemical energy storage system (100) is configured according to claim 1, wherein the method comprises:

providing (320) at least one pair of wedge bodies (1a, 1b) with a wedge body (30) and a counter-wedge body (20), arranging (340) the wedge body (30) on the component (40) of the electrochemical energy storage system (100), arranging (360) the component (40) having the wedge body (30) arranged on the component (40) in the interior space (I) of the housing (10) of the electrochemical energy storage system (100), and arranging (380) the counter-wedge body (20) between the wedge body (30) and a housing inner wall (11) of the housing (10) to generate a wedge force for fixing and positioning the component (40) in the interior space (I) of the housing (10) of the electrochemical energy storage system (100).

13. A pair of wedge bodies (1a, 1b), wherein the pair of wedge bodies (1a, 1b) is a pair of wedge bodies (1a, 1b) according to claim 1.

14. The electrochemical energy storage system (100) according to claim 1, wherein the housing section (21) of the counter-wedge body (20) is configured in a shape of a skewed cylinder.

15. An electrochemical energy storage system (100) for a vehicle (200), wherein the electrochemical energy storage system (100) comprises a housing (10) having an interior space (I), at least one component (40) arranged in the interior space (I) of the housing (10), and at least one pair of wedge bodies (1a, 1b) for fixing and positioning the at least one component (40) arranged in the interior space (I) of the housing (10), wherein the at least one pair of wedge bodies (1*a*, 1*b*) comprises:

a wedge body (30) having a component section (32) and a counter-wedge body section (31), wherein the counter-wedge body section (31) is configured to be inclined at least regionally relative to the component section (32) such that the wedge body (30) forms a wedge body end (38) and a wedge body tip (39) opposite the wedge body end (38) in a wedge body direction (Z1) of the wedge body (30), and wherein the wedge body (30) is arranged with the component section (32) at least regionally on the at least one component (40) arranged in the interior space (I) of the housing (10), a counter-wedge body (20) having a housing section (21) and a wedge body section (22), wherein the wedge body section (22) is configured to be inclined at least regionally relative to the housing section (21) such that the counter-wedge body (20) forms a counter-wedge body end (28) and a counter-wedge body tip (29) opposite the counter-wedge body end (28) in a counter-wedge body direction (Z2) of the counter-wedge body (20), and wherein the counter-wedge body (20) is arranged with the housing section (21) at least regionally on a housing inner wall (11) of the housing (10), wherein, along a height direction (HR) of the housing (10), the counter-wedge body (20) is arranged in the counter-wedge body direction (Z2) with the wedge body section (22) opposite the wedge body direction (Z1) of the wedge body (30) at least regionally on the counter-wedge body section (31) of the wedge body (30) in order to generate a wedge force for fixing and positioning the at least one component (40) arranged in the interior space (I) of the housing (10), wherein the component section (32) of the wedge body (30) comprises at least one fixing element (34*a*, 34*b*) for fixing the wedge body (30) on the at least one component (40).

16. An electrochemical energy storage system (100) for a vehicle (200), wherein the electrochemical energy storage system (100) comprises a housing (10) having an interior space (I), at least one component (40) arranged in the interior space (I) of the housing (10), and at least one pair of wedge bodies (1*a*, 1*b*) for fixing and positioning the at least one component (40) arranged in the interior space (I) of the housing (10), wherein the at least one pair of wedge bodies (1*a*, 1*b*) comprises:

a wedge body (30) having a component section (32) and a counter-wedge body section (31), wherein the counter-wedge body section (31) is configured to be inclined at least regionally relative to the component section (32) such that the wedge body (30) forms a wedge body end (38) and a wedge body tip (39) opposite the wedge body end (38) in a wedge body direction (Z1) of the wedge body (30), and wherein the wedge body (30) is arranged with the component section (32) at least regionally on the at least one component (40) arranged in the interior space (I) of the housing (10), a counter-wedge body (20) having a housing section (21) and a wedge body section (22), wherein the wedge body section (22) is configured to be inclined at least regionally relative to the housing section (21) such that the counter-wedge body (20) forms a counter-wedge body end (28) and a counter-wedge body tip (29) opposite the counter-wedge body end (28) in a counter-wedge body direction (Z2) of the counter-wedge body (20), and wherein the counter-wedge body (20) is arranged with the housing section (21) at least regionally on a housing inner wall (11) of the housing (10), wherein, along a height direction (HR) of the housing (10), the counter-wedge body (20) is arranged in the counter-wedge body direction (Z2) with the wedge body section (22) opposite the wedge body direction (Z1) of the wedge body (30) at least regionally on the counter-wedge body section (31) of the wedge body (30) in order to generate a wedge force for fixing and positioning the at least one component (40) arranged in the interior space (I) of the housing (10), wherein the wedge body (30) comprises, on the component section (32), at least one recess (35*a*, 35*b*) for reducing contact with the at least one component (40) accommodated in the interior space (I) of the housing (10), and/or the wedge body (30) comprises, on the counter-wedge body section (31), at least one recess (35*a*, 35*b*) for reducing contact with the counter-wedge body (20), and/or the counter-wedge body (20) comprises at least one recess (25*a*, 25*b*, 25*c*, 25*d*) on the housing section (21) for reducing contact with the housing inner wall (11) of the housing (10), and/or the counter-wedge body (20) comprises at least one recess (25*a*, 25*b*, 25*c*, 25*d*) on the wedge body section (22) for reducing contact with the wedge body (30).

\* \* \* \* \*